(12) United States Patent
Spitkovsky

(10) Patent No.: US 8,645,473 B1
(45) Date of Patent: Feb. 4, 2014

(54) DISPLAYING ELECTRONIC MAIL IN A RATING-BASED ORDER

(75) Inventor: Valentin Spitkovsky, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 2068 days.

(21) Appl. No.: 11/173,803

(22) Filed: Jun. 30, 2005

(51) Int. Cl.
*G06F 15/16* (2006.01)

(52) U.S. Cl.
USPC .......................................................... 709/206

(58) Field of Classification Search
USPC .......................................................... 709/206
See application file for complete search history.

(56) References Cited

U.S. PATENT DOCUMENTS

| | | | |
|---|---|---|---|
| 6,212,553 B1* | 4/2001 | Lee et al. | 709/206 |
| 6,654,791 B1 | 11/2003 | Bates et al. | 709/207 |
| 6,925,605 B2* | 8/2005 | Bates et al. | 715/745 |
| 7,433,832 B1* | 10/2008 | Bezos et al. | 705/26 |
| 2004/0039786 A1* | 2/2004 | Horvitz et al. | 709/207 |
| 2004/0128355 A1* | 7/2004 | Chao et al. | 709/206 |
| 2004/0177271 A1* | 9/2004 | Arnold et al. | 713/201 |
| 2005/0131866 A1* | 6/2005 | Badros et al. | 707/3 |
| 2005/0204009 A1* | 9/2005 | Hazarika et al. | 709/206 |

OTHER PUBLICATIONS

Soukhanov Anne H. Webster's II, New Riverside University Dictionary. MA, Houghton Mifflin Company 1984 p. 506, 807. PE1625. W244.*
ClearContext Corp., "ClearContext Inbox Manager for Microsoft Outlook: Designing a More Effective Inbox," Mar. 2004, pp. 1-4.

* cited by examiner

*Primary Examiner* — Rupal Dharia
*Assistant Examiner* — Tom Y Chang
(74) *Attorney, Agent, or Firm* — Morgan, Lewis & Bockius LLP

(57) ABSTRACT

In one embodiment, a technique for managing electronic mail comprises receiving an email; assigning a rating to the email; and displaying the email in a rating-based order.

33 Claims, 6 Drawing Sheets

| From | Subject | Received | Urgent | Important |
|---|---|---|---|---|
| Eric Smith | Dinner ? | 4/21/05 | 1———10 | 1———10 |
| Peter Willis | Deadline | 4/21/05 | 1———10 | 1———10 |
| Kathy Smith | Project Cancelled | 4/20/05 | 1———10 | 1———10 |
| Jim Jones | Weekend | 4/22/05 | 1———10 | 1———10 |
| Matt Wagner | Your Shoes | 4/23/05 | 1———10 | 1———10 |

302  300a  300b

| From | Subject | Received | Urgent | Important |
|---|---|---|---|---|
| Eric Smith | Dinner ? | 4/21/05 | 1 —— 10 | 1 —— 10 |
| Peter Willis | Deadline | 4/21/05 | 1 —— 10 | 1 —— 10 |
| Kathy Smith | Project Cancelled | 4/20/05 | 1 —— 10 | 1 —— 10 |
| Jim Jones | Weekend | 4/22/05 | 1 —— 10 | 1 —— 10 |
| Matt Wagner | Your Shoes | 4/23/05 | 1 —— 10 | 1 —— 10 |

| Mailing Lists | Useful | | |
| --- | --- | --- | --- |
| | High | Medium | Low |
| Mailing List 1 | 0 | 10 | 200 |
| Mailing List 2 | 37 | 82 | 16 |
| Mailing List 3 | 14 | 5 | 0 |
| Mailing List 4 | 2 | 4 | 90 |
| Mailing List 5 | 10 | 20 | 500 |

FIG. 5A

| Mailing Lists | Urgent | | |
| --- | --- | --- | --- |
| | High | Medium | Low |
| Mailing List 1 | 0 | 2 | 208 |
| Mailing List 2 | 4 | 115 | 16 |
| Mailing List 3 | 7 | 12 | 0 |
| Mailing List 4 | 0 | 0 | 96 |
| Mailing List 5 | 0 | 1 | 529 |

FIG. 5B

DISPLAYING ELECTRONIC MAIL IN A RATING-BASED ORDER

BACKGROUND OF THE INVENTION

With so much email traffic, users may find that they have more electronic mail than they can easily manage. Some users subscribe to multiple mailing lists, adding to the volume of emails. Additionally, the order in which emails are typically displayed may not assist in helping a user organize and manage such an influx of communications. It would be beneficial to have a more useful way of managing emails.

BRIEF DESCRIPTION OF THE DRAWINGS

Various embodiments of the invention are disclosed in the following detailed description and the accompanying drawings.

FIG. 3 is an example of a display of emails in one embodiment.

FIGS. 5A-5B show examples of useful information that may be presented to a user in one embodiment.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In one embodiment, a method and system are provided for rating email messages and using this rating to present the emails.

Figure 1:
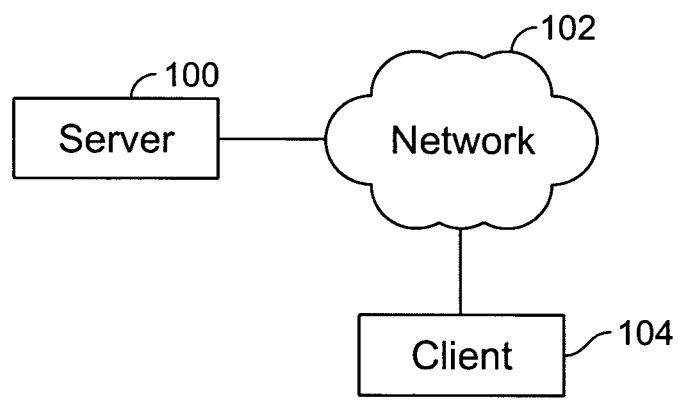
FIG. 1 is a system diagram of a system suitable for managing email in one embodiment.

FIG. 1 is a system diagram of a system suitable for managing email in one embodiment. In this example, a server 100 is shown to be coupled with a network 102, which is also shown to be coupled with a client machine 104. An example of server 100 is a web-based email server. In this example, the electronic mails may be stored on server 100 and accessed through network 102 by client 104. As discussed in more detail in conjunction with the remaining figures, emails may be received and ranked by server 100. These ranked emails are then presented to client 104 in an organized manner associated with the rankings. An example of such an organized manner is to display them in a rank-based order. In another embodiment, the emails may be received and ranked by client 104 prior to being displayed. The example shown in FIG. 1 may be expanded to include multiple servers and multiple clients.

Figure 2:
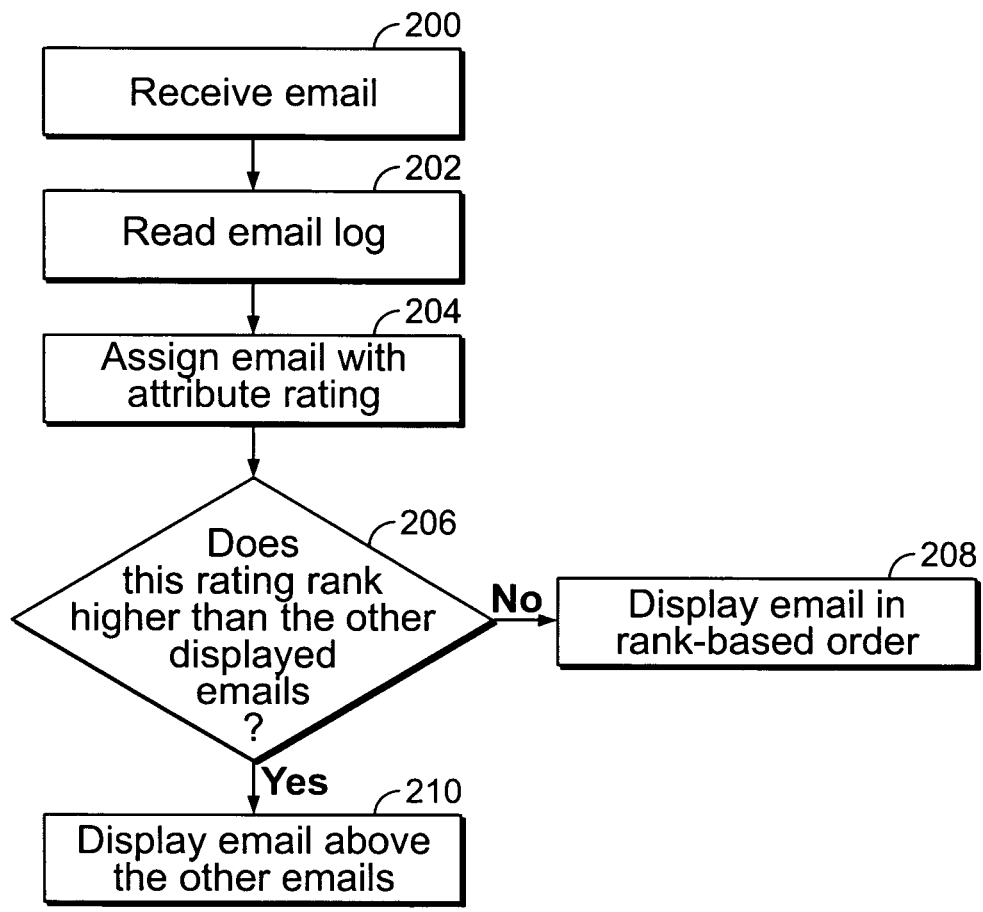
FIG. 2 is a flow diagram of a method for managing electronic mail in one embodiment.

FIG. 2 is a flow diagram of a method for managing electronic mail in one embodiment. In this example, an email is received at 200. For example, an email may be received by server 100 of FIG. 1. An email log is then read at 202. An email log may include any information associated with emails, such as when an email was received or sent, how often an email was read, how often an email exchange occurs between a particular sender/recipient, whether an email is forwarded, how quickly an email is deleted, or any other information which may be of interest. An example of an email log includes a flat text file that may later be stored in queriable form such as a SQL database.

The received email is then assigned with an attribute rating at 204. Examples of attributes include urgency, importance, relevance, usefulness, priority, work-related, social, family, or any other attribute that a user might want associated with an email. Examples of an attribute rating includes a scale from 1 to 10; or a few discrete such as high, medium, and low; or a circle with varying degrees of "pie-slices".

Assigning the email with an attribute rating may be performed by guessing the rating. For example, if the attributes are "importance" and "urgency", then the importance/urgency of an email may be guessed by analyzing factors. Examples of these factors include: sender, number of recipients, send time of email, time elapsed between send time and email open time, length of thread generated by this email (number of replies), length of time before deletion of this email, keyword matches in this email or attachments, types of attachment and their sizes. Such a list of features can be used in conjunction with standard machine learning techniques such as the Naïve Bayes algorithm, or Support Vector Machines. A training set including positive and negative examples may be used to guess the attribute rating to be assigned to the received email. An example of information that might be in a training set is that when the sender was John, the user declared the email most important. Another example of a machine learning technique that may be used to assign an email with an attribute rating includes the algorithm disclosed in U.S. patent application Ser. No. 10/676,571, entitled "Methods and Apparatus for Probabilistic Hierarchical Inferential Learner", filed Sep. 3, 2003.

The attribute rating assigned to the incoming email may be stored on a server, such as server 100 of FIG. 1.

In the example of FIG. 2, it is then determined whether this attribute rating ranks higher than the ratings of the other displayed emails at 206. If this rating ranks higher, then this email is displayed above the other emails at 210. If, however, the rating of this received email is not higher than the other displayed emails at 206, then this email is displayed in rate-based order at 208, so that it is displayed below the other emails with higher rating and above other emails with lower rating.

Accordingly, the emails are displayed in the order of one or more attributes in one embodiment. The attributes may be user defined. For example, a user may choose to rank his emails based on sender and date so that the most recently received emails from his spouse and his boss are displayed first before emails from his soccer teammates.

If more than one attribute is used, then there may be several ways of determining the display order. One example includes preferentially weighting different attributes.

FIG. 3 is an example of a display of emails. In this example, emails are shown in the order of attribute rating. In this example, the attributes are "urgent" and "important". Emails from Eric Smith and Peter Willis are shown to be of the most urgent and important emails and are listed first accordingly. An email from Cathy Smith is shown to have a lower rating in urgency and importance and is listed below Eric Smith and Peter Willis. Likewise, the emails from Jim Jones and Matt Wagner are shown to have lower ratings than the other emails and are listed last.

The sliding scales 300A-300B may show the initial guesses in the attribute rating. In this example, the sliding scales 300A-300B are shown to scale from 1 to 10, wherein 10 is the most urgent and most important. The user may correct the initial guess in the rating of the attributes in urgency and importance, and change the sliding scale to a desired rate. For example, a user may select scale bar 302 and move it to a desired rating. If a user changes an attribute rating, the email may be reordered according to its new rating.

In another example, a dot may be used wherein a faint dot may indicate the guessed rating and a solid dot may indicate a user corrected rating.

Figure 4:
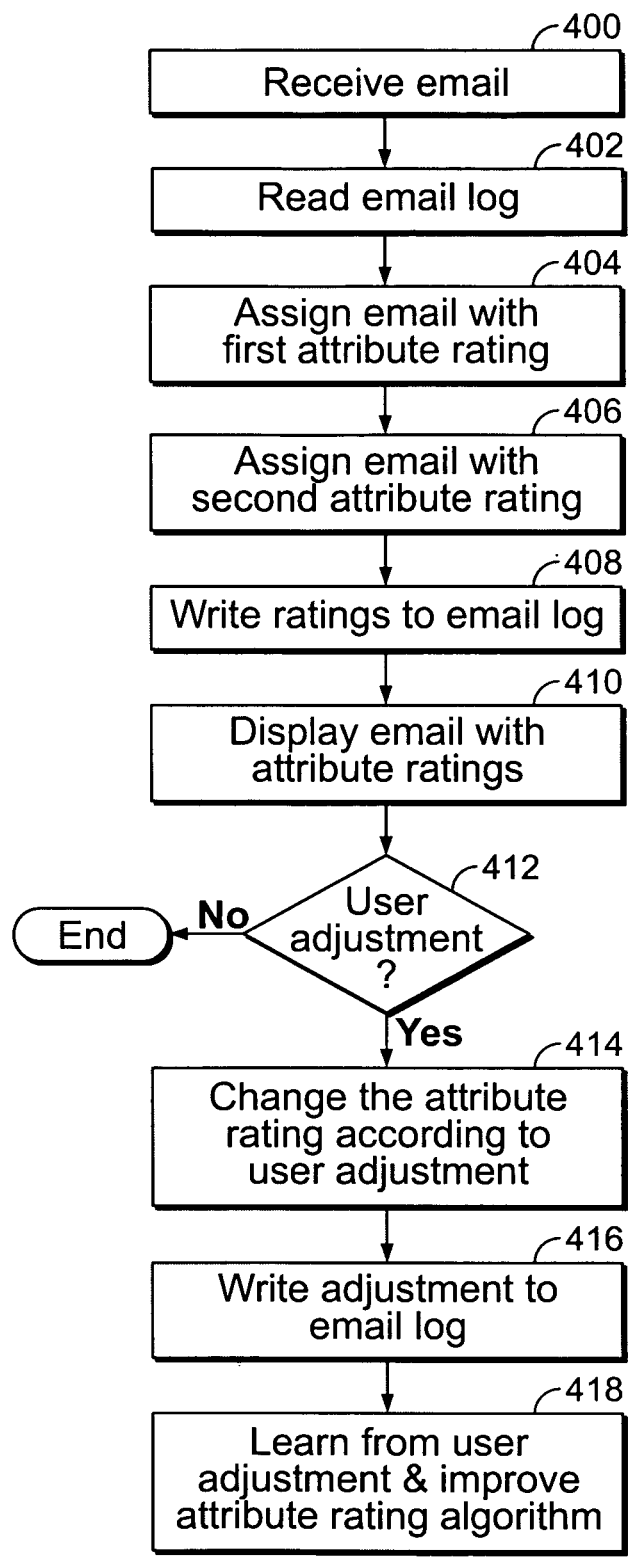
FIG. 4 is a flow diagram of a method for incorporating user adjustment in ratings according to one embodiment.

FIG. 4 is a flow diagram of a method for incorporating user adjustment in ratings according to one embodiment. In this example, an email is received at 400. The email log is read at 402. The received email is then assigned a first attribute rating based on information in the email log at 404. The received email is then assigned a second attribute rating based on the information from the email log at 406. In one embodiment, the email log and assigning of attribute ratings are as described in conjunction with the example shown in FIG. 2.

The attribute ratings of the received email are written to the email log at 408. For example, if the received email was sent from Eric Smith regarding dinner and the urgency rating is assigned to be 9, and the importance rating is assigned to be 9, then this information is written to the email log at 408. The received email is then displayed with the attribute ratings at 410. Although two attributes are discussed in this example, any number of attributes may be rated and displayed.

It is then determined whether the user has adjusted an attribute rating at 412. If the user does not adjust an attribute rating, then the process with regard to this received email ends. If however, the user adjusts an attribute rating at 412, such as moving the sliding scale 312 of FIG. 3, then the attribute rating is changed according to the user adjustment at 414. The adjustment is then written to the email log at 416. The user adjustment is used to teach and improve the attribute rating algorithm at 418. The emails are redisplayed in the changed rating-based order. As previously mentioned, the attribute algorithm may learn from the user changes through standard machine learning techniques such as through Naïve Bayes algorithms, Support Vector Machines or other maximum margin classifiers.

In one embodiment, attribute ratings of one email may be automatically adjusted based on user's feedback of another email. For example, if email X is marked as highly urgent and the user does not correct this attribute for email X, but does make several adjustments to other emails, then email X may be considered to be correct in being marked as highly urgent. In another example, a user may correct an initial email rating of "urgent" to being "not urgent". If this email has a large number of recipients, it might imply that another email with a large number of recipients is also not urgent. Accordingly, attribute information may be learned about a first email from the user's actions toward a second email.

In another embodiment, the attribute ratings of an email from one user may be influenced by corrections of another user's email if the attributes are similar. For example, User X may correct attribute ratings of emails with multiple recipients. User Y may also be receiving emails with multiple recipients. The User X corrections of attribute ratings may be applied to determining an attribute rating for a similar email for User Y if User Y's attribute is similar to User X's. If an email is received by User X that has 100 recipients, and User X changes the "family" attribute of this email to 0, then this information may be used in the "family" attribute rating for User Y's email with 100 recipients.

In another embodiment, the attribute rating(s) may be shown along with an explanation of what factors were considered in reaching this rating.

FIGS. 5A-5B show examples of useful information that may be presented to a user in one embodiment. In these examples, information from the email log may be used to give statistical information to the user. In this example, a user subscribes to five mailing lists and his attributes are "useful" and "urgent", and his rating system is high, medium, and low. During a given period of time, such as one week, this user received 0 emails at a rating of high usefulness, 10 emails at medium usefulness, and 200 at low usefulness ratings from email list 1. He received 37 high rated emails, 82 medium rated emails, and 16 low rated emails from email list 2. He received 14 high, 5 medium, and 0 low rated emails from mailing list 3, etc. Given this information, the user can see that mailing list 1 provides a high number of low usefulness emails and 0 highly rated useful emails. If this user receives a large volume of emails, he may choose to either unsubscribe from email list 1 or filter emails from mailing list 1 into a low priority file. Mailing list 3 however, sent 14 highly useful emails and 0 low-ranked usefulness emails. In this case, the user may decide to continue his subscription to mailing list 3. A similar chart is shown in FIG. 5B for the attribute of urgency. Accordingly, the attribute rating information may be used to assist the user in email management.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing electronic mail comprising:
receiving a first email addressed to a first recipient;
assigning a rating to the first email based at least in part on a prior interaction of the first recipient with a second email and prior interaction of a second recipient with a third email, wherein the third email is received by the second recipient and has attributes similar to attributes of the first email;
preparing for display a list of emails, including the first email, in a rating-based order;
receiving a user-initiated change to the rating, which was assigned to the first email based at least in part on a prior interaction of the first recipient with a second email and prior interaction of a second recipient with a third email; and
after receiving the user-initiated change to the rating of the first email, preparing the list of emails, including the first email, for redisplay in a changed rating-based order;

the method further comprising reading information from an email log, wherein the assigning includes assigning the rating to the first email based, at least in part, on the information read from the email log;
  wherein the email log includes information related to a set of emails, the information including how often each email was read, how quickly each email is deleted and the number of emails in a thread.

2. The method of claim 1, wherein the rating is associated with an attribute of the first email.

3. The method of claim 1, wherein the rating is associated with a user-defined attribute.

4. The method of claim 2, wherein the attribute is urgency.

5. The method of claim 2, wherein the attribute is importance.

6. The method of claim 1, wherein the email log includes information concerning prior user-initiated changes to the ratings of emails, wherein the assigning includes assigning the rating to the first email based, at least in part, on the information concerning prior user-initiated changes to the ratings of emails.

7. The method of claim 1, further comprising writing the assigned rating of the first email to the email log.

8. The method of claim 1, further comprising learning from the user initiated change to affect the rating of emails.

9. The method of claim 1, further comprising writing the user-initiated change to the email log.

10. The method of claim 1, further comprising assigning a second rating to the first email, wherein the second rating is associated with a second attribute.

11. The method of claim 1, wherein assigning a rating to the first email is associated with learning from a change made to a third email.

12. A system of managing electronic mail comprising:
  a processor configured to:
    receive a first email addressed to a first recipient;
    assign a rating to the first email based at least in part on a prior interaction of the first recipient with a second email and prior interaction of a second recipient with a third email, wherein the third email is received by the second recipient and has attributes similar to attributes of the first email;
    prepare for display a list of emails, including the first email, in a rating-based order, including displaying the rating associated with the first email;
    receive a user-initiated change to the rating, which was assigned to the first email based at least in part on a prior interaction of the first recipient with a second email and prior interaction of a second recipient with a third email;
    after receiving the user-initiated change to the rating of the first email, prepare the list of emails, including the first email, for redisplay in a changed rating-based order; and
  a memory coupled to the processor, wherein the memory provides the processor with instructions;
  wherein the processor is further configured to read information from an email log, wherein the assigning includes assigning the rating to the first email based, at least in part, on the information read from the email log; and
  wherein the email log includes information related to a set of emails, the information including how often each email was read, how quickly each email is deleted and the number of emails in a thread.

13. The system of claim 12, wherein the rating is associated with an attribute of the first email.

14. The system of claim 13, wherein the attribute is urgency.

15. The system of claim 13, wherein the attribute is importance.

16. The system of claim 13, wherein the processor is further configured to assign a second rating to the first email, wherein the second rating is associated with a second attribute.

17. The system of claim 12, wherein the rating is associated with a user-defined attribute.

18. The system of claim 12, wherein the email log further includes information concerning prior user-initiated changes to the ratings of emails, wherein the assigning includes assigning the rating to the first email based, at least in part, on the information concerning prior user-initiated changes to the ratings of emails.

19. The system of claim 12, wherein the processor is further configured to write the assigned rating of the first email to the email log.

20. The system of claim 12, wherein the processor is further configured to learn from the user initiated change to affect the rating of emails.

21. The system of claim 12, wherein the processor is further configured to write the user-initiated change to the email log.

22. The system of claim 12, wherein assigning a rating to the first email is associated with learning from a change made to a third email.

23. A non-transitory computer readable storage medium storing one or more programs, the one or more programs including instructions for:
  receiving a first email addressed to a first recipient;
  assigning a rating the first email based at least in part on a prior interaction of the first recipient with a second email and prior interaction of a second recipient with a third email, wherein the third email is received by the second recipient and has attributes similar to attributes of the first email;
  preparing for display a list of emails, including the first email, in a rating-based order, including displaying the rating associated with the first email;
  receiving a user-initiated change to the rating of the first email, which was assigned to the first email based at least in part on a prior interaction of the first recipient with a second email and prior interaction of a second recipient with a third email; and
  after receiving the user-initiated change to the rating of the first email, preparing the list of emails, including the first email, for redisplay in a changed rating-based order;
  wherein the one or more programs include instructions for reading information from an email log, wherein the instructions for assigning include instructions for assigning the rating to the first email based, at least in part, on the information read from the email log; and
  wherein the email log includes information related to a set of emails, the information including how often each email was read, how quickly each email is deleted and the number of emails in a thread.

24. The non-transitory computer readable storage medium of claim 23, wherein the rating is associated with an attribute of the first email.

25. The non-transitory computer readable storage medium of claim 24, wherein the attribute is urgency.

26. The non-transitory computer readable storage medium of claim 24, wherein the attribute is importance.

27. The non-transitory computer readable storage medium of claim 23, wherein the rating is associated with a user-defined attribute.

28. The non-transitory computer readable storage medium of claim 23, wherein the email log further includes information concerning prior user-initiated changes to the ratings of emails, wherein the assigning includes assigning the rating to the first email based, at least in part, on the information concerning prior user-initiated changes to the ratings of emails.

29. The non-transitory computer readable storage medium of claim 23, wherein the one or more programs further include instructions to write the assigned rating of the first email to the email log.

30. The non-transitory computer readable storage medium of claim 23, wherein the one or more programs further include instructions to learn from the user initiated change to affect the rating of emails.

31. The non-transitory computer readable storage medium of claim 23, wherein the one or more programs further include instructions to write the user-initiated change to the email log.

32. The non-transitory computer readable storage medium of claim 23, wherein the one or more programs further include instructions to assign a second rating to the first email, wherein the second rating is associated with a second attribute.

33. The non-transitory computer readable storage medium of claim 23, wherein assigning a rating to the first email is associated with learning from a change made to a third email.

* * * * *